Oct. 6, 1953  G. E. FRANCK  2,654,559
DIAPHRAGM VALVE
Filed March 8, 1950
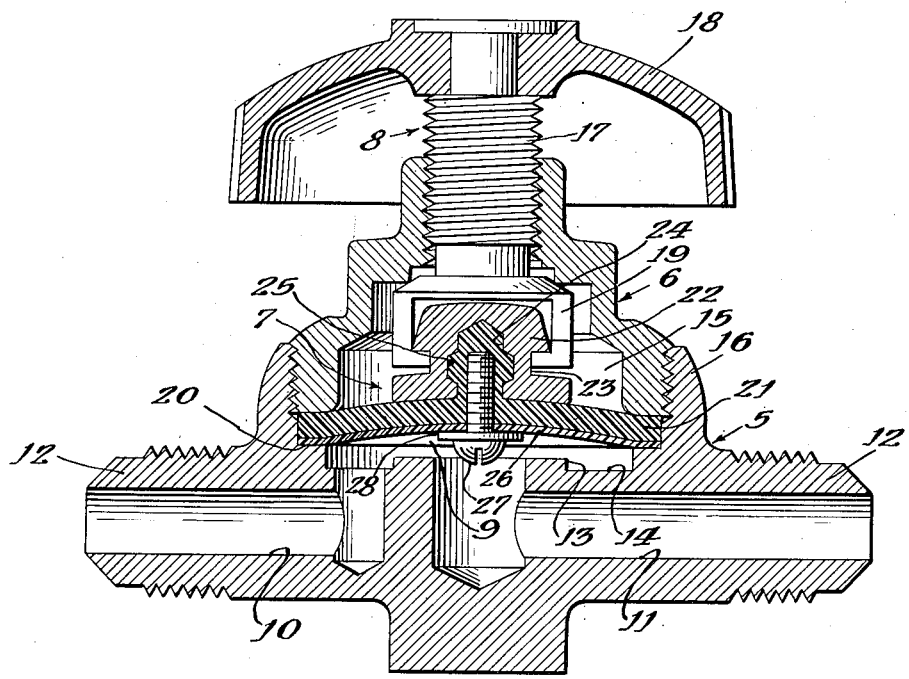
Inventor:
George E. Franck
By:
Schroeder, Merriam, Hofgren & Brady
Attorneys Patented Oct. 6, 1953

2,654,559

UNITED STATES PATENT OFFICE 2,654,559

DIAPHRAGM VALVE

George E. Franck, Riverside, Ill., assignor to The Imperial Brass Manufacturing Company, a corporation of Illinois Application March 8, 1950, Serial No. 148,360

4 Claims. (Cl. 251—24)

The invention relates generally to valves and more particularly to diaphragm valves used, for example, in refrigeration systems.

In the past both metals and plastics have been employed in the construction of the diaphragm of these valves and both have proved unsatisfactory. Metallic diaphragms, after a period of flexing under pressure, have a tendency to crystallize and cause leakage. Some plastic diaphragms that have the proper thermal and physical properties do not have the chemical properties enabling the diaphragms to resist the chemical action of the refrigerants. Others have a tendency to dry out when subjected to heat for any period of time. Others do not have the necessary physical characteristics.

It is an object of the invention, therefore, to provide a new and improved diaphragm valve in which the shortcomings of prior diaphragm valves above referred to are overcome.

Another object is to provide a diaphragm valve in which the diaphragm is composed of material falling in the class of plastics and having both the necessary chemical as well as physical and thermal properties to withstand the repeated flexings, the temperatures to which the valve is subjected, and above all to be impervious and resistant to the strong chemicals found in refrigeration systems.

Still another object is to provide a diaphragm valve in which the diaphragm is composed of laminations of plastic materials, each lamination contributing a certain characteristic to the diaphragm as a whole, giving the resultant diaphragm all of the necessary chemical, physical and thermal properties.

Other objects and advantages will become apparent from the following detailed description taken in connection with the accompanying drawings, in which:

Fig. 1 is an enlarged diametrical section of a diaphragm valve embodying the features of my invention.

Fig. 2 is a section taken approximately along the line 2—2 of Fig. 3 and illustrates a modified form of diaphragm unit.

Fig. 3 is a transverse section taken approximately along the line 3—3 of Fig. 2.

While the invention is susceptible of various modifications and alternative constructions, it is herein shown in a preferred embodiment and one modification. It is not intended, however, that the invention is to be limited thereby to the specific constructions shown. On the contrary, it is intended to cover all modifications and alternative constructions falling within the spirit and scope of the invention as defined in the appended claims.

The invention is embodied in a diaphragm type valve of more or less conventional construction comprising generally a main body member 5, a bonnet 6, a diaphragm unit 7 and an actuating means 8. The main body member is generally cylindrical with a central axially opening chamber 9. Opening to the chamber are two ports or passages 10 and 11, each terminating at the outer end in a radially projecting, externally threaded nipple 12 for the attachment of a conduit or pipe. One of the passages, herein 11, opens to the chamber 9 centrally thereof through a boss 13 projecting slightly above the bottom of the chamber to form, as will presently become apparent, a valve seat. The other passage 10 opens to the chamber also through the bottom 14 thereof but near the periphery.

Completing the casing of the valve is the bonnet 6 which also is provided with a chamber 15. The bonnet at its inner end is externally threaded to cooperate with internal threads formed in the upstanding annular flange-like portion 16 of the main body member. Threaded through the outer end of the bonnet 6 is a valve actuating stem 17 having an actuating handle 18 nonrotatably fixed on the outer end thereof and terminating at its inner end in a socket 19.

The chamber 9 in the main body member is stepped radially outwardly at a point slightly above the top of the boss 13, as viewed in Fig. 1, so as to form an annular shoulder 20. Adapted to be clamped between the shoulder 20 and the inner end of the bonnet 6 is the peripheral edge of the diaphragm unit 7 in order that the diaphragm may serve as a valve cooperating with the seat formed by the boss 13 to control flow between the passages 10 and 11.

Herein the diaphragm proper is composed of materials falling in the general class of plastics. In order that the diaphragm may have the necessary physical and thermal characteristics, such as flexibility, strength to withstand pressures to which it is subjected, resistance to deterioration due to temperature change as well as the necessary chemical characteristics, the diaphragm is here given a laminated construction. A first or main lamina 21 is composed of one of the plastics having the desired thermal and physical properties or characteristics. This lamina is made comparatively thick being on the order of ⅛″ and is composed of a material which at that thickness has flexibility and strength to withstand the pressure to which the diaphragm is subjected. A preferred material is polyethylene. This material, in addition to possessing the characteristics above noted has the advantage that it is relatively inexpensive and thus contributes toward the perfection of a competent yet not expensive diaphragm valve.

It is desirable in diaphragm valves that the valve stem be capable of lifting the diaphragm off its seat as well as to be able to force the same down against the seat. This requires the valve stem to be secured or attached to the diaphragm and has also presented a problem. Any fastening arrangement which pierced the diaphragm was, of course, undesirable because of the reduction in protection and effectiveness of the diaphragm to prevent leakage. Brazing or welding or in some other manner securing an actuating means to a metallic diaphragm has resulted in a weakening of the diaphragm and a setting up of local stresses which after a number of flexing operations caused breakdown of the diaphragm. By the construction about to be described, this problem is also overcome. Herein there is provided a cap-like element 22 formed externally with an annular groove 23 by which it is rotatably received in the socket-like member 19. Internally the cap 22 is formed with an axial bore 24 opening through one end of the cap but not through the other. Intermediate its ends the bore 24 is expanded radially to have an annular groove 25. The lamina 21 is cast and, as an incident to the casting operation, some of the material composing the lamina is forced into the bore 24 and its groove 25 so that an integral part of the lamina 21 is secured to the cap member 22. With the material composing the lamina 21 expanded into the groove 25 there is little possibility of the cap 22 being pulled off of the lamina.

The second lamina 26 is placed over that face of the lamina 21 which is exposed to the fluid flowing through the valve. This lamina is selected for its chemical stability, particularly its resistance to chemicals present in refrigeration systems. The physical properties of this lamina are not of great importance because these properties are supplied by the lamina 21, save that the lamina 26 should be flexible in thin section. A preferred material and the one of which lamina 26 herein is composed is polytetrafluoroethylene. The lamina 26 herein has a thickness of only .03". The lamina 26 is not and need not be bonded to the lamina 21, but is simply placed over the lamina 21 since it is held securely and in fluid-tight relationship around its periphery by the clamping action between the bonnet 6 and the shoulder 20. To secure the lamina 26 at its center, it and the lamina 21 are drilled axially with the bore running into but not through the axial projection of the lamina 21 extending into the cap member 22. A screw 27 whose threads have a root diameter equal to the bore in the laminae 21 and 26 is then turned into the bore with a washer 28 of the same material as the lamina 26 interposed between the head of the screw and the lamina. As the screw is drawn down, it causes the washer 28 to form a tight seal with the lamina 26 around the bore into which the screw 27 is threaded, thereby preventing any of the chemical reaching the lamina 21. While it is desirable to keep the chemical controlled by the valve away from the lamina 21, no great harm is done should there be slight leakage for the polyethylene composing the lamina 21 is itself highly resistant to chemicals, though admittedly not possessing the degree of resistance possessed by lamina 26. Furthermore should there be some leakage between the washer and the lamina 26, there would still be no escape of fluid for lamina 21 is a completely imperforate diaphragm.

The screw 27 performs a second function in that, as it is turned into the bore drilled in the axial extension or projection of the lamina 21, it reduces the opening in the cap member 22 and thus further reduces the possibility of the projection being pulled out of the cap member during an unseating or valve opening operation.

In Figs. 2 and 3 there is disclosed a slightly modified form of diaphragm unit. In this form the diaphragm is still composed of two laminae 21' and 26' composed of the same materials respectively as the laminae 21 and 26. Also still forming a part of the diaphragm unit is a cap-like member 29 generally similar to the cap member 22 save for the shape of its recess 30 into which a portion of the lamina 21' is forced during the casting operation. This recess 30 is of uniform size throughout its length, having no annular restrictions or enlargements, but is formed with longitudinally extending serrations 31 (see Fig. 3) which serve firmly to hold the cap member and the diaphragm-forming laminations against relative rotation. Also present is a screw 27' and a washer 28'. In this form, however, the screw 27' extends into the cap member 29 so as to form an even more positive retention of the cap member on the diaphragm proper. While in this modification the diaphragm proper, that is, the laminae 21' and 26', are no longer imperforate, the likelihood of leakage is almost an improbability. With the screw 27' threaded into the cap member, the washer may be very tightly drawn against the lamina 26' thereby eliminating or at least reducing to the vanishing point the possibility of leakage at that point. Further, with the bore through the laminations having a diameter equal to the root diameter of the threads of the screw 27', the screw forms its own threads in the lamina 21', for example, and thus there is a seal throughout the entire portion of the screw embedded in the lamina 21'. The clamping action between the cap member and the screw head and washer further effects a seal throughout the entire contact area between the lamina 21' and the cap member.

I claim as my invention:

1. A valve comprising, in combination, a main body member having a chamber, a boss centrally of the chamber, a pair of ports in said body member opening to the chamber, one of the ports opening through said boss, a bonnet threaded into said body member, a valve actuating stem projecting from said bonnet in axial alignment with said boss and carrying at its inner end a socket-forming member, a metallic cap member engageable with said socket member to be rotatable relative thereto while restrained against axial movement relative thereto and having an axially opening recess, and a flexible diaphragm in overlying relation to said boss clamped at its periphery between said bonnet and said body member and at its center having an axial projection cast in the recess in said cap member, said diaphragm being composed of a plurality of laminations of materials falling in the class of ethylene polymer plastics, one of which laminations provides strength to resist the physical forces to which the diaphragm is subjected and the other of which resists the chemical actions to which the diaphragm is subjected.

2. A valve comprising, in combination, a main body member having a chamber, a boss centrally of the chamber, a pair of ports in said body member opening to the chamber, one of the ports opening through said boss, a bonnet threaded into said body member, a valve actuating stem projecting from said bonnet in axial alignment with said boss and carrying at its inner end a socket-forming member, a metallic cap member engageable with said socket member to be rotatable relative thereto while restrained against axial movement relative thereto and having an axially opening recess, an imperforate flexible diaphragm in overlying relation to said boss clamped at its periphery between said bonnet and said body member, said diaphragm being composed of a first relatively thick lamina having an axial projection cast in the recess in said cap member, and a second relatively thin lamina of a material highly resistant to chemical action, and a screw extending through said second lamina and into the axial projection of said first lamina and terminating within said axial projection, said screw being self-threaded into the laminae to hold said laminae together and expand said axial projection tightly within the recess in said cap member.

3. As an element in a valve, a diaphragm unit comprising a first relatively thick lamina composed of one of the ethylene polymer plastics flexible at the thickness of the lamina and having the strength to withstand certain pressures, a second relatively thin lamina composed of one of the ethylene polymer plastics highly resistant to chemical action, a cap-like element having an axial recess opening through one end only thereof, an axial projection on said first lamina cast within the recess in said cap-like element, and a screw self-threaded through said second lamina and into the projection of said first lamina to hold the laminae to said cap member.

4. As an element of a valve, a diaphragm unit comprising a cap-like element having an axial recess opening only through one end thereof and the recess having intermediate its ends an annular groove, a first lamina composed of polyethylene having an axial projection cast into and filling the groove and said recess, said first lamina being flexible and providing a certain resistance to rupture, a second very thin lamina composed of polytetrafluoroethylene highly resistant to chemical action, said second lamina being substantially about one fourth as thick as the first lamina, a hole extending through said second lamina and into the axial projection of said first lamina and terminating within said projection, a screw self-threaded in said hole to expand said axial projection tightly within the recess in the cap-like element, and a washer of the same material as said second lamina interposed between the screw head and said second lamina to form a seal around the opening in said second lamina through which said screw projects.

GEORGE E. FRANCK.

References Cited in the file of this patent

UNITED STATES PATENTS

| Number | Name | Date |
|---|---|---|
| 572,580 | Spitzenberg | Dec. 8, 1896 |
| 1,385,058 | Warter | July 19, 1921 |
| 1,470,352 | Dubbs | Oct. 9, 1923 |
| 1,783,281 | Cox | Dec. 2, 1930 |
| 1,802,136 | Carter | Apr. 21, 1931 |
| 2,323,531 | Franck | July 6, 1943 |
| 2,394,243 | Joyce | Feb. 5, 1946 |
| 2,416,061 | McAlevy | Feb. 18, 1947 |
| 2,459,720 | Poltorak | Jan. 18, 1949 |